United States Patent
Pecen et al.

(10) Patent No.: US 6,282,182 B1
(45) Date of Patent: Aug. 28, 2001

(54) METHOD AND APPARATUS FOR SIMULTANEOUS CIRCUIT SWITCHED VOICE AND GPRS DATA INTERCHANGE

(75) Inventors: Mark E. Pecen, Rolling Meadows, IL (US); Niels Peter Skov Andersen, Roskilde (DK); Charles Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/479,042

(22) Filed: Jan. 7, 2000

(51) Int. Cl.⁷ .................. H04Q 7/00; H04J 3/00
(52) U.S. Cl. ............ 370/336; 370/493; 370/528
(58) Field of Search .................. 370/328, 329, 370/336, 337, 345, 347, 352, 465, 493, 494, 495, 528; 455/422, 466

(56) References Cited

U.S. PATENT DOCUMENTS 5,553,079 * 9/1996 Niki et al. .................. 370/528
5,642,354 * 6/1997 Spear .................. 370/329
5,740,531 * 4/1998 Okada .................. 455/403
5,745,695 * 4/1998 Gilchrist et al. .................. 370/330

OTHER PUBLICATIONS

M. Mouly of Nortel, "Overall description of GPRS simple Class A mobiles", Nov. 19, 1999, 15 pages.

* cited by examiner

Primary Examiner—Ricky Ngo
(74) Attorney, Agent, or Firm—Michael C. Soldner

(57) ABSTRACT

A simplified version of a defined GPRS/EDGE Class A mobile station that incorporates transmission and reception of GPRS/EDGE data during discontinuous transmission and reception modes on a dedicated traffic channel, and that includes a mechanism for streaming GPRS/EDGE data to and from a packet-switched channel, along with optional association of a voice timeslot with one or more GPRS/EDGE data timeslots. GPRS/EDGE packet data and circuit-switched voice data are simultaneously transmitting along a dedicated GSM voice traffic channel by transmitting the GPRS/EDGE packet data between occurrences of circuit-switched voice data and silence descriptor frame data along a dedicated voice traffic channel.

14 Claims, 5 Drawing Sheets

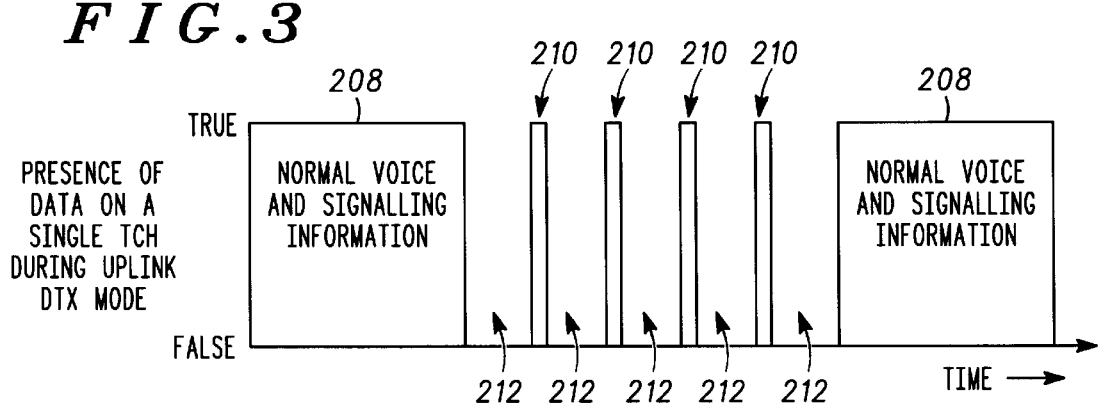
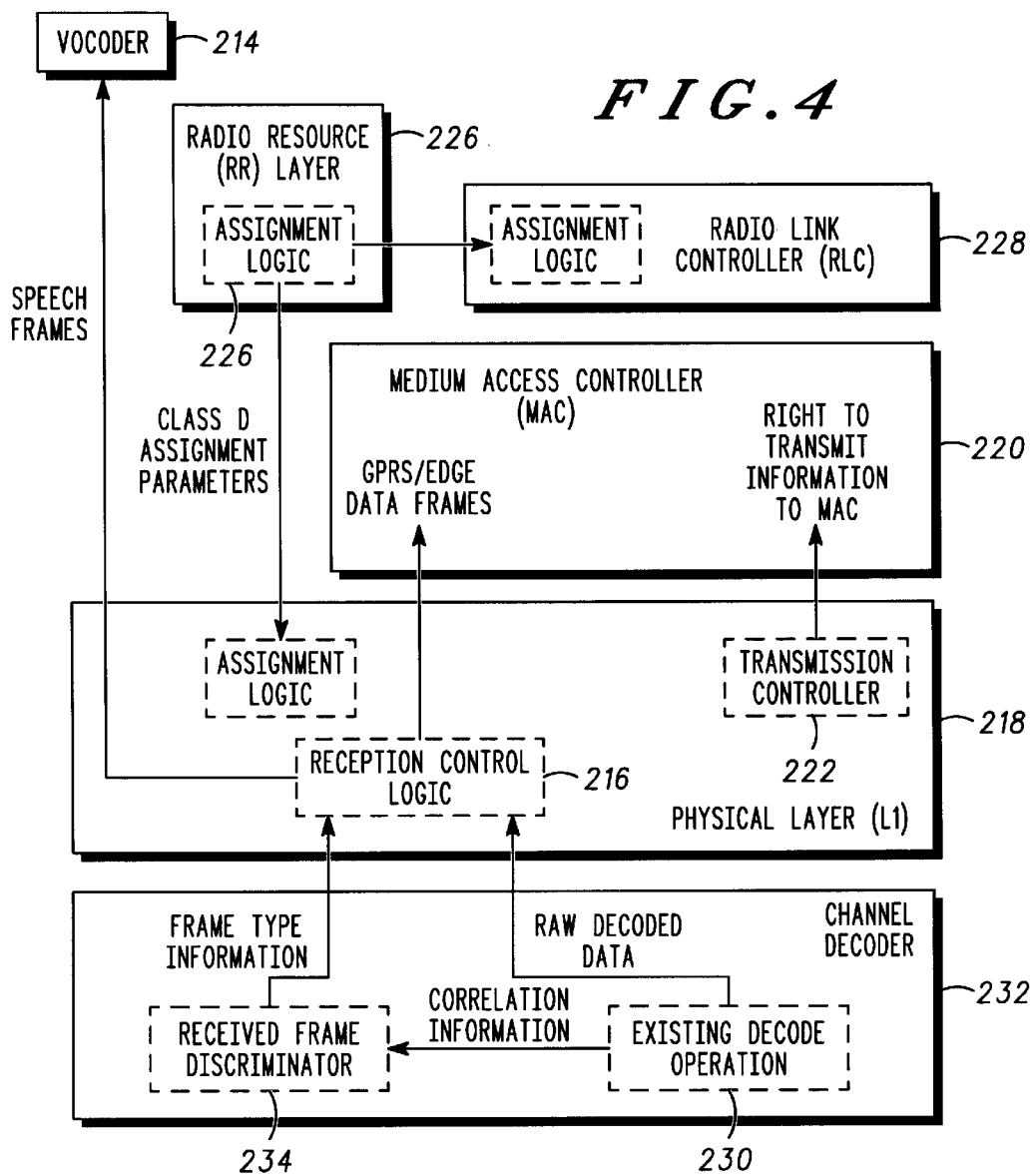

METHOD AND APPARATUS FOR SIMULTANEOUS CIRCUIT SWITCHED VOICE AND GPRS DATA INTERCHANGE

FIELD OF THE INVENTION

The present invention relates generally to signaling in GSM communication systems and in particular, the present invention relates to method and apparatus that allows circuit-switched voice and GPRS data interchange to occur simultaneously.

BACKGROUND OF THE INVENTION

Global System for Mobile Communications (GSM) General Packet Radio Service (GPRS) is intended to allow a service subscriber the ability to send and receive data in an end-to-end packet transfer mode without utilizing network resources in the circuit-switched mode. GPRS permits efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on.

The European Telecommunications Standards Institute (ETSI) GSM specifications define what is referred to as a "mobile station class" for GPRS mobile stations. The mobile station class specifies some of the behavior to which a mobile station must conform regarding its operation in packet mode, circuit-switched mode, or both packet and circuit-switched mode. For example, one such mobile station class is a Class A mobile station which supports simultaneous attachment, monitoring, activation, invocation and traffic flow on both circuit-switched voice and packet-switched data services. On the other hand, a Class B mobile station has been defined to support only simultaneous attachment, monitoring and activation on both circuit-switched voice and packet-switched data services, with invocation and traffic flow possible on either service on a mutually exclusive basis. Finally, a Class C mobile station is defined to support only non-simultaneous attach, i.e. mutually exclusive attach, on either circuit-switched voice or packet-switched data services.

Mobile station classes may also be assigned, or changed, in some cases by the user, subject to limitations such as manufacturer's options and equipment limitations. For example, a user application may have the ability to issue a command to change the mobile station class of the subscriber equipment currently in use. The mobile station classes are therefore to be treated as "effective" classes, as users may exercise some control over mobile station class identity.

One of the problems associated with providing a Class A capable mobile station is that two receivers and two transmitters are required, along with a combiner/duplexer, interface to a common Subscriber Identity Module (SIM) card and possibly an additional call processor, depending upon the number of embedded user-level applications desired to coexist during circuit-switched voice and packet-switched data service operation. This presents the need among mobile station manufacturers to develop a whole new architecture for such equipment, resulting in an increased cost of the device.

As illustrated in FIG. 1, in a known fixed allocation of an existing GPRS/EDGE medium access control operation, a signaling flow is such that a timeslot allocation bitmap is sent from the network to a physical layer 100, or layer 1. A medium access controller 110 recognizes an address, and a radio link controller 120 assembles a control message. A radio resource layer 130 sends a bitmap of when to transmit to the medium access controller 110, which transmits GPRS/EDGE data to the physical layer 100. On the other hand, in dynamic allocation of a known existing GPRS/EDGE medium access control operation, a signaling flow is such that a control packet is sent to a physical layer 140 of a mobile station, and a medium access controller 150 decodes and recognizes an address or an uplink state flag (USF), giving the mobile station the right to transmit in the TDMA frame, so that GPRS/EDGE data is transmitted to the physical layer 140.

Since there has typically been a large impact of the service on both the mobile station and base station signaling, in addition to there being certain technical problems associated with the approach, attempts at designing a simplified Class A mobile station service have proven to be inefficient. For example, the manner in which the existing medium access control (MAC) method for GPRS on a dedicated channel is utilized, in the presence of another dedicated channel to carry voice information in the usual manner, would allow the mobile station to be handed over in two different directions, i.e. the circuit-switched voice call may have been handed to another GSM cell while the packet switched data transfer may have remained in the old cell, or possibly have been forced to reselect to a cell different from the one on which the circuit-switched voice call resides. This may require the mobile station to support the simultaneous reception of two RF channels, which is beyond the scope of a simplified simultaneous voice/data service.

Accordingly, what is needed is a simplified method for allowing simultaneous circuit-switched voice and GPRS data interchange to occur using current mobile station hardware architecture.

BRIEF DESCRIPTION OF THE DRAWINGS

FIG. 3 is a graphic representation of a transmission channel according to the present invention.

FIG. 4 is a schematic diagram of system architecture according to the present invention.

DETAILED DESCRIPTION OF THE PREFERRED EMBODIMENT

The present invention is a simplified version of a defined GPRS/EDGE Class A mobile station that incorporates transmission and reception of GPRS/EDGE data during discontinuous transmission and reception modes on a dedicated traffic channel, and that includes a mechanism for streaming GPRS/EDGE data to and from a packet-switched channel, along with optional association of a voice timeslot with one or more GPRS/EDGE data timeslots.

Figure 1:
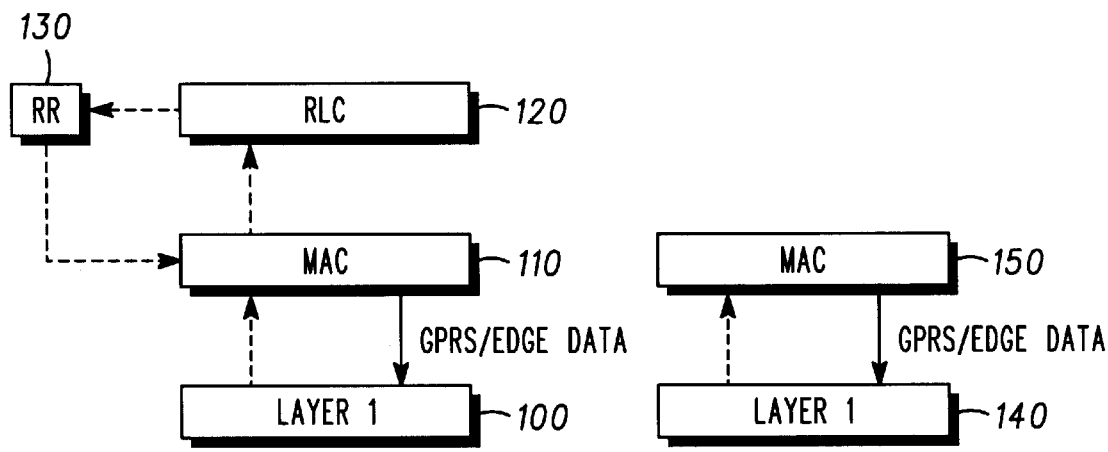
FIG. 1 is a schematic diagram of a prior art fixed and dynamic allocation of an existing GPRS/EDGE medium access control operation.
Figure 2:
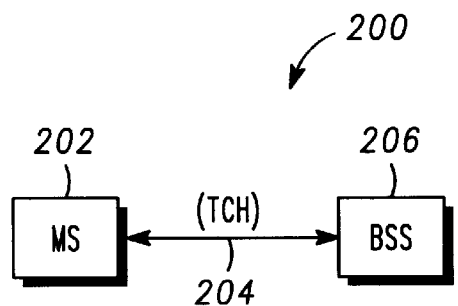
FIG. 2 is a schematic diagram of a communication system according to the present invention.

As illustrated in FIG. 2, a communication system 200, includes a mobile station 202, such as a handset, for example, for receiving and transmitting both circuit-switched voice data and packet-switched data along a traffic channel (TCH) 204 to a base station subsystem 206, operating under ETSI GSM specifications. When data is transmitted from the base station subsystem 206 to the mobile station 202, such transmission is commonly referred to as a "downlink transmission, while data transmitted from the mobile station 202 to the base station subsystem 206 is commonly known as an "uplink" transmission. Although only a single mobile station and a single base station subsystem are shown in FIG. 1, it is understood that the communication system contains a plurality of both mobile stations and base station subsystems.

As illustrated in FIGS. 2 and 3, during a discontinuous transmission (DTX) operation between the mobile station 202 and the base station subsystem 206, in the absence of normal speech or signaling frames 208, the mobile station 202 stops transmitting on its traffic channel 204 with the base station subsystem 206, except for the periodic transmission of a silence descriptor (SID) frame 210, which is sent in certain TDMA frames on the uplink. Frame periods 212 which occur between SID frames 210 are therefore available for the transmission of GPRS/EDGE data, provided that the channel access method is modified to accommodate for the characteristics of DTX. Similarly, during a discontinuous reception (DRX) operation, the mobile station 202 receives SID frames 210 periodically in the absence of voice or signaling frames 208, and is therefore able to receive GPRS/EDGE data during such periods in which normal circuit-switched GSM voice, signaling or SID frames are not received.

As illustrated in FIG. 4, the architecture of each of the mobile stations includes a vocoder 214 for compressing voice data directed to the vocoder 214 from a reception control logic component 216 that resides in a physical layer 218, or layer 1 (L1). The physical layer 218 provides interface between radio frequency hardware and a call processor (not shown), including scheduling of reception and transmission of physical data, receiver gain control, transmitter power control, signal level measurements, and so forth.

In addition, GPRS/EDGE data frames are directed by the reception control logic component 216 to a medium access controller (MAC) layer 220. The medium access controller 220 organizes the transmission and reception of packet-based information onto and from the physical layer 218, primarily including logic by which the mobile station 202 is informed of it's right to transmit at a given point. The medium access controller layer 220 is also responsible for the recognition of messages which are addresses to the mobile on the downlink side.

As further illustrated in FIG. 4, a transmission controller component 222, which is located in the physical layer 218 is in charge of analyzing uplink data transmission during a discontinuous transmission DTX mode, and is intended to grant the right to transmit to the MAC component when operation is in a streaming MAC mode according to the present invention, which is described below. In addition, the existing, known GPRS/EDGE MAC (FIG. 1) can be modified according to the present invention to add the streaming MAC mode as part of its capability, which would be then commanded by the network.

Signaling messages are received by a radio resource (RR) layer 224 from the physical layer 218, and an assignment control logic component 226 located in the radio resource layer 224 is distributed between the radio resource (RR) layer 224, the physical layer (Layer 1) 218, and a radio link controller (RLC) 228 in the mobile station 202. The assignment control logic component 226 distributes logic that informs the mobile station that it is in an operation, corresponding to the simplified version of defined GPRS/EDGE Class A mobile station according to the present invention, and also informs the mobile station of the assignment of the associated timeslots if any. The radio resource layer 224 controls the mobile station 202 with regard to network-oriented signaling pertaining to radio messages, i.e., timeslot assignments, packet data channel setups/teardowns, RF channel assignments, and so forth, in addition to passing messages originating from the network via the physical layer 218. The radio link controller 228 is primarily involved with error correction at the radio layer, i.e., to absorb the periodic errors which result from the fading channel, and also handles certain aspects of GPRS/EDGE data transfer setup and teardown. The assignment control logic component 226 analyzes assignment messages with regard to parameters of the simplified version of the GPRS/EDGE Class A mobile station according to the present invention and sets up the physical layer 218 to transmit and/or receive on one or more timeslots, according to the present invention, described below. This includes the assignment of a voice timeslot with the optional possibility of one or more firmly-associated data timeslots according to the mobile station's multislot class. If one or more data timeslots are associated with the voice/alternating data timeslot, then the MAC mode for each timeslot would be issued by the network to inform the mobile station how it is to determine when it has the right to transmit.

Finally, as illustrated in FIG. 4, an existing decode operation 230 of a channel decoder 232 transmits correlation information to a received frame discriminator 234 and raw decoded data is transferred from the existing decode operation 230 of the channel decoder 232 to the reception control logic component 216 of the physical layer 218. The received frame discriminator component 234 of the channel decoder 232 distinguishes between speech frames and GPRS/EGPRS data frames and provides information about each decoded frame to the physical layer 218.

According to the present invention, an additional GPRS medium access control (MAC) mode, by which GPRS data is "streamed" to and from the air interface in a circuit-switched manner is utilized. Using this method for streaming GPRS/EDGE data to and from a packet-switched channel, data may be sent and received on the same circuit-switched voice timeslot during discontinuous transmission DTX and discontinuous reception DRX periods as circuit-switched information. Although the medium access controller layer 220 would operate in a circuit-switched manner, the packet-based nature of the data above the medium access controller layer 220 would be preserved, i.e. its addressing, radio link control (RLC) protocol, logical link control (LLC) and so on.

Essentially, the "streaming" MAC mode disables the packet-based GPRS MAC behavior, by which the mobile station is informed of the right to transmit from the network. This is because in the operation according to the present invention, there would be no need to monitor uplink state flags (USF) which grant the right to transmit in dynamic timeslot allocation mode, or to monitor transmission bit maps in fixed allocation mode. Rather, the right of the mobile to transmit would, according to the present invention, be governed by the uplink timeslot assignment and the availability of time in which to send data in DTX mode.

Once the medium access controller layer 220 is set to the streaming mode, it learns of its right to transmit, not from the network, but from the DTX physical layer logic on the uplink side. On the downlink side, the channel decoder performs the discrimination required to determine whether it has received either a voice frame or a GPRS/EDGE data frame; voice frames are handled in the usual manner, while GPRS/EDGE data frames are routed to the medium access controller layer 220 by the physical layer 218, at which additional levels of discrimination are performed. i.e. addressing and control/data differentiation. The downlink example shows how speech and data frames are discriminated from one another by the channel decoder 232, which supplies both raw decoded data and information about the data frame to the physical layer 218. This discrimination may be made by a DSP Channel Decoder (FIG. 6) by analyzing stealing flags, which are set differently for GPRS/EDGE data than those for CS voice frames, or by analyzing a training sequence in a received burst, which is a different ergodic sequence for voice bursts as for GPRS/EDGE data bursts, resulting in a different correlation function, which may be used to distinguish the two types of frames.

Figure 5:
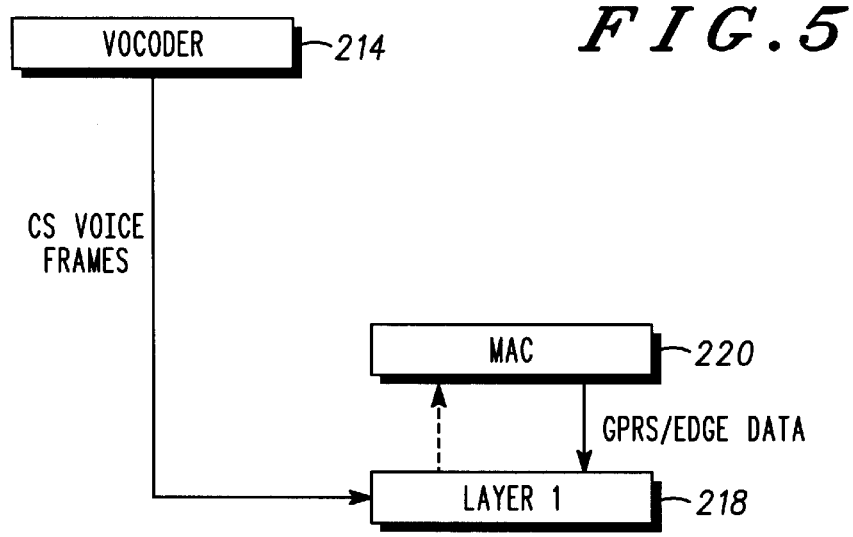
FIG. 5 is a schematic diagram of uplink signaling flow according to the present invention.
Figure 6:
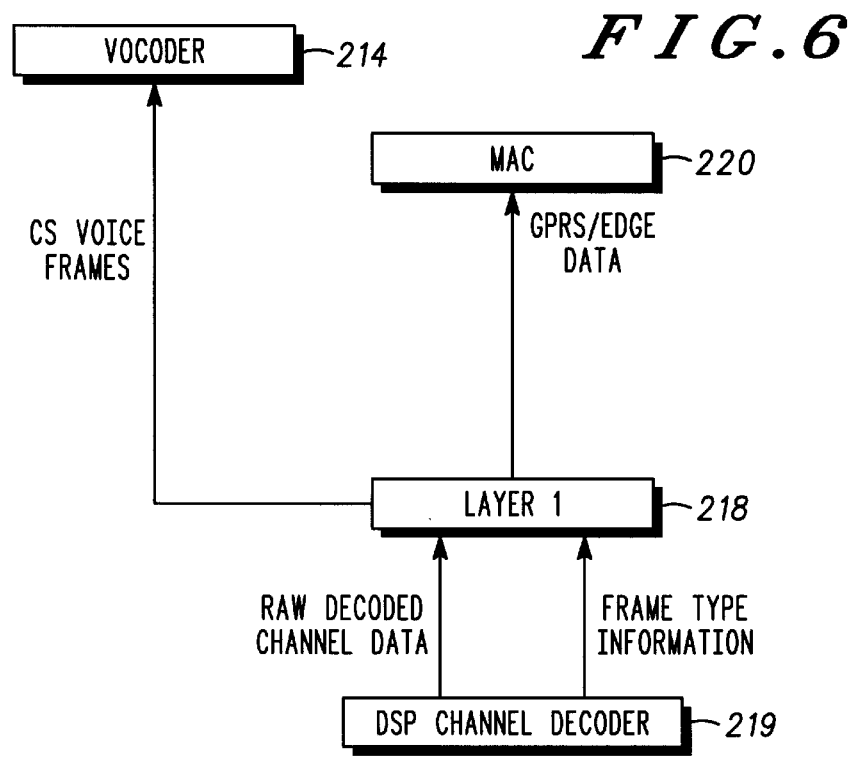
FIG. 6 is a schematic diagram of downlink signaling flow according to the present invention.

As illustrated in FIG. 5, in the uplink signaling flow of the streaming MAC operation according to the present invention, the physical layer 218 has instantaneous knowledge as to whether there are circuit-switched voice, silent descriptor frames, or signaling frames to send. The physical layer 218 gives the medium access controller 220 the right to transmit between normal circuit-switched voice frames, signaling voice frames, and silence descriptor frames. As illustrated in FIG. 6, in the downlink signaling flow of the streaming MAC operation according to the present invention, raw decoded channel data and frame type information are received at the physical. layer 218 from a DSP channel decoder 219. The physical layer 218 uses the frame type information to send speech frames to the vocoder 214 and to send GPRS/EDGE data frames to the medium access controller layer 220.

In a method for associating and controlling a voice timeslot and one or more GPRS/EDGE data timeslots according to the present invention, for mobile station classes that permit multiple timeslots, the timeslots used for data would be "firmly associated" with one another and the active circuit-switched timeslot for speech, over the life of the simplified version of defined GPRS/EDGE Class A mobile station operation according to the present invention in a given cell. For simplicity of mobile reception/transmission logic, any additional timeslots that would be associated with a circuit-switched voice timeslot would be required to be contiguous with one another.

Figure 7:
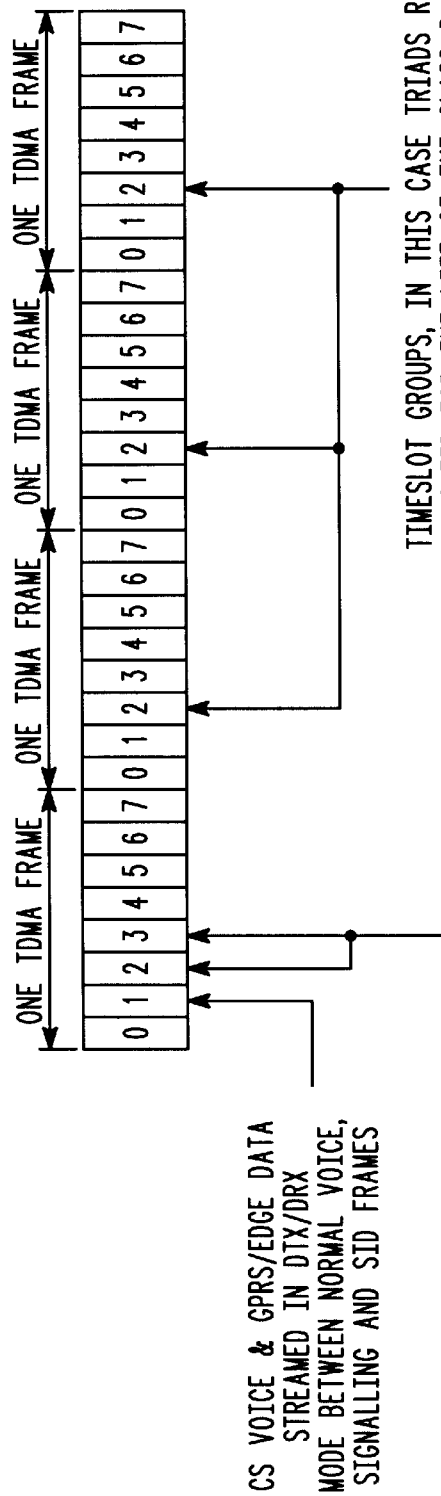
FIG. 7 is schematic diagram of timeslot groups according to the present invention.

As illustrated in FIG. 7, control-switched voice and GPRS/EDGE data, which are streamed in the discontinuous transmission DTX and discontinuous reception DRX mode between normal voice, signaling and silence descriptor frames are located in timeslot 1. Additional timeslots, which are firmly associated with one another for the life of the simplified version of defined GPRS/EDGE Class A mobile station operation, according to the present invention, on which GPRS/EDGE data may be sent are located in timeslots 2 and 3. While the use of three timeslots is shown and described in FIG. 7, it is understood that the present invention may utilize any number of the eight timeslots, and is therefore not is not limited to the use of three timeslots.

In the preceding example, circuit-switched voice and streaming GPRS/EDGE data are sent on timeslot 1 of every TDMA frame. In addition, there are two other timeslots which are firmly associated with timeslot 1, i.e. both timeslot 2 and timeslot 3 in this example. Firmly associated timeslots exist when all allocated timeslots in a TDMA frame are logically associated for the life of the operation of the simplified version of defined GPRS/EDGE Class A mobile station operation, according to the present invention, in a given cell. The circuit-switched data call would have priority, and upon handover, any associated data timeslots may or may not follow the circuit-switched voice timeslot.

The operation of the simplified version of defined GPRS/EDGE Class A mobile station operation according to the present invention would support any combination of GPRS/EDGE data transmission during periods of no speech, normal signaling or silence descriptor frame transmission in discontinuous transmission, and reception DTX/DRX modes and/or GPRS/EDGE data transmission on one or more timeslots which are to be firmly associated with the active circuit-switched voice timeslot. It is therefore possible for a mobile station utilizing the simplified version of defined GPRS/EDGE Class A mobile station operation according to the present invention to use only the firmly associated data timeslots for GPRS/EDGE data if discontinuous transmission and reception DTX/DRX is not active. It is also possible, according to the present invention, to use the method of interchanging data during discontinuous transmission and reception DTX/DRX inactivity on the speech timeslots only, without the firm association of separate data timeslots.

It should be noted that there is no requirement for the firmly-associated data timeslots to be dedicated to one mobile station, although the timeslots are logically bound. Therefore, in the downlink direction, the base station may assign blocks to different mobile stations, who would recognize and filter on their own addresses at the medium access controller MAC layer. According to the present invention, the mobile station would only take measurements on the circuit-switched timeslot, the base station may utilize downlink power control on the firmly associated data timeslots (if any), as the base station is required to transmit at a power level appropriate for the mobile station to whom a block is addressed.

According to the present invention, if a voice timeslot and one or more firmly-associated data timeslots are included, the mobile station may utilize any of the three previously-discussed MAC methods for controlling the right of the mobile station to transmit, i.e. fixed timeslot allocation, dynamic timeslot allocation or streaming MAC as commanded by the network. If the ETSI-specified fixed or dynamic timeslot allocation methods are used, this would permit the conservation of uplink resources, as the associated data timeslots may be used by other mobile stations. This is in contrast to the case in which the simplified version of the defined GPRS/EDGE Class A mobile station, according to the present invention, utilizes the transmission and reception of circuit-switched data between voice, signaling and SID information, in which the mobile station must utilize the streaming MAC method on the uplink timeslot that is shared with voice traffic.

In order to enter and leave operation of the simplified version of defined GPRS/EDGE Class A mobile station operation, according to the present invention, the existing GSM GPRS/EDGE mechanism of "net-work commanded cell selection/reselection" would be used. This would provide a simple means of entering and leaving this mode without much additional signaling information required, and would operate with minimum impact on any transfer that may be simultaneously occurring at the time of the reselection, as a mechanism exists in GPRS/EDGE to accommodate the likelihood of such an occurrence. This involves a procedure that specifies that the sender retain the last unacknowledged logical link control (LLC) frame; if a reselection should occur during a transfer, then the sender starts with the beginning of the last unacknowledged LLC frame and the receiver clears its receive window upon reselection, resulting in no loss of data at the LLC level and above. As a result, if reselection to or from the operation of the simplified version of defined GPRS/EDGE Class A mobile station, according to the present invention, results in a completely different timeslot or channel coding scheme assignments, then the existing GPRS/EDGE taxonomy would absorb the impact of reselection. According to the present invention, an information element is specified for uplink and downlink assignment messages, and a timeslot reconfigure message which would contain parameters, according to the present invention, such as the firmly associated timeslot assignment.

Figure 8:
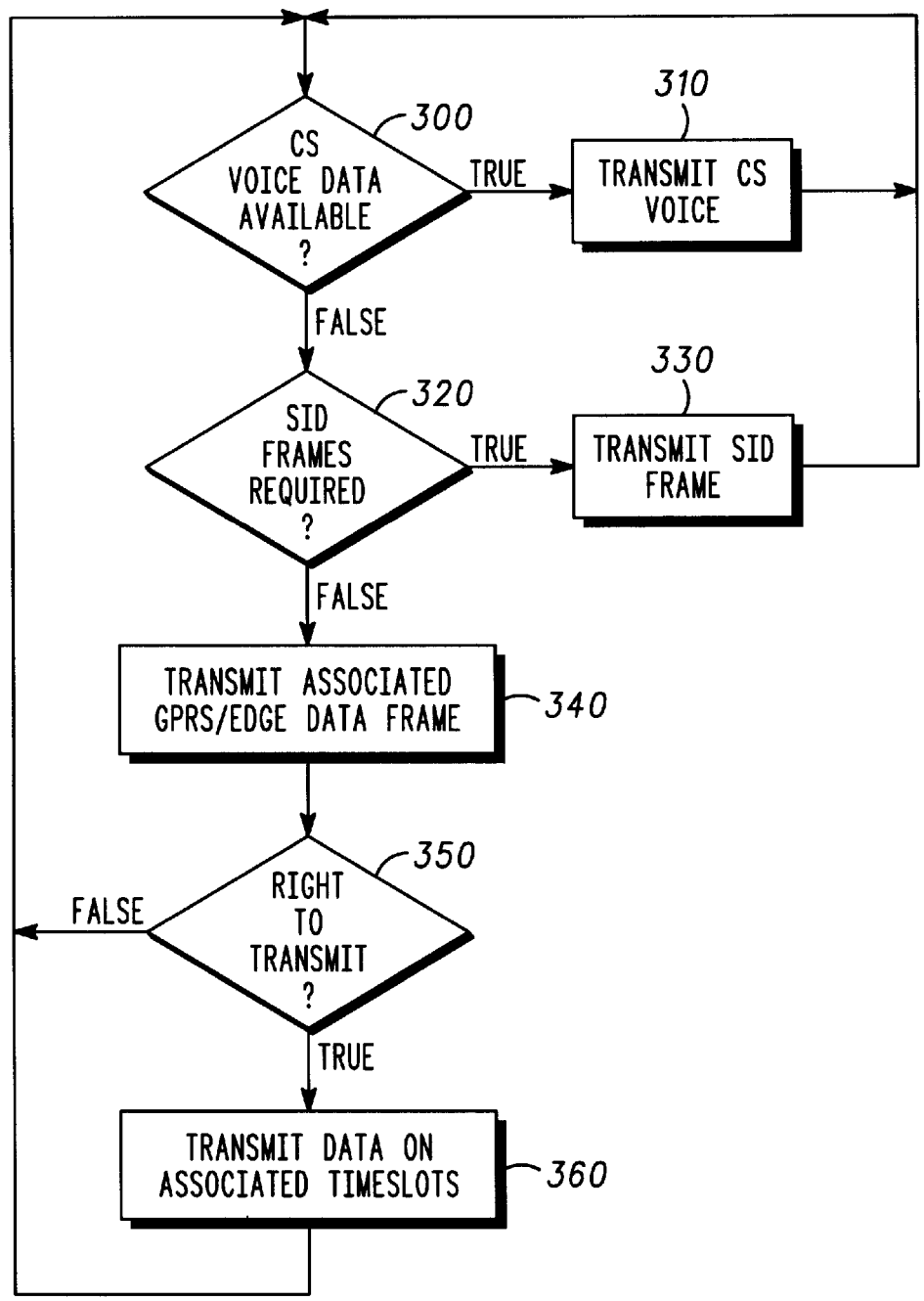
FIG. 8 is a flowchart of operation of a simplified version of a defined GPRS/EDGE Class A mobile station, according to the present invention.

Operation of the simplified version of defined GPRS/EDGE Class A mobile station, according to the present invention, is illustrated in FIG. 8. When circuit-switched voice data is available in Step 300, the circuit-switched voice data is transmitted on a traffic channel that has been dedicated to voice operation during setup (Step 310). When circuit-switched data is not available, a determination is made as to whether a silence descriptor frame is required (Step 320). If required, the silence descriptor frame is transmitted on the dedicated traffic channel (Step 330), and if not required, an associated GPRS/EDGE frame is transmitted on the dedicated traffic channel (Step 340). This transmission of the circuit-switched voice and GPRS/EDGE data frame associated with Steps 300–330 of FIG. 8 is described above in reference to timeslot 1 of FIG. 7.

When the network grants the mobile station the right to transmit on the associated data timeslots (Step 350), GPRS/EDGE data is transmitted on one ore more associated timeslots in Step 360, which is described above in reference to timeslots 2 and 3 of FIG. 7, for example, and operation returns to Step 300.

The simplified version of defined GPRS/EDGE Class A mobile station, according to the present invention, permits operators to offer simultaneous voice and GPRS/EDGE data services on relatively low-cost equipment having a single receiver/transmitter. A feature is also desired that would provide continuous service between 3G systems and GPRS/EDGE. (3 G systems support simultaneous circuit-switched and packet switched data inter-change).

While a particular embodiment of the present invention has been shown and described, modifications may be made. It is therefore intended in the appended claims to cover all such changes and modifications which fall within the true spirit and scope of the invention.

What is claimed is:

1. A method of simultaneously transmitting GPRS/EDGE packet data and circuit-switched voice data along a dedicated GSM voice traffic channel, comprising the steps of:
   determining whether the circuit-switched voice data is available to be transmitted along the traffic channel;
   determining whether a silence descriptor frame must be sent along the traffic channel in response to circuit-switched voice data not being available; and
   transmitting an associated GPRS/EDGE data frame along the traffic channel between occurrences of the circuit-switched voice data and the silence descriptor frame.

2. The method of claim 1, further comprising the steps of:
   determining whether a right to transmit on a previously assigned associated GSM/EDGE data only timeslot in a current TDMA frame has been granted; and
   transmitting on the associated timeslots.

3. The method of claim 1, further comprising the step of associating and controlling a voice timeslot and data timeslots, wherein the data timeslots are firmly associated with each other and with the voice timeslot.

4. A communication system, comprising:
   a base station subsystem; and
   a mobile station receiving and transmitting circuit-switched voice data and packet-switched data along a traffic channel to the base station subsystem, wherein the mobile station transmits packet-switched data to the base station subsystem and receives packet-switched data from the base station subsystem during frame periods occurring at associated timeslots between voice and signaling frames and silence descriptor frames of discontinuous transmission and discontinuous reception operations between the mobile station and the base station subsystem.

5. The communication system of claim 4, further comprising an assignment control logic component layer informing the mobile station of assignment of the associated timeslots.

6. The communication system of claim 4, wherein packet-switched data is transmitted and received on the same circuit-switched voice timeslot during discontinuous transmission and discontinuous reception operations as circuit-switched data, and transmission by the mobile station is governed by an uplink timeslot assignment and availability of time in which to send data in discontinuous transmission operation.

7. The communication system of claim 4, further comprising:
   a physical layer; and
   a medium access controller layer organizing transmission and reception of packet-based information onto and from the physical layer, including logic by which the mobile station is informed of a right to transmit.

8. The communication system of claim 4, wherein the associated timeslots include a voice timeslot and data timeslots, and wherein the data timeslots are firmly associated with each other and with the voice timeslot.

9. The communication device of claim 4, wherein circuit-switched voice data and packet-switched data are streamed in the discontinuous transmission and discontinuous reception operations between the voice and signaling frames and silence descriptor frames are located in a first timeslot, and packet-switched data is located in one or more firmly associated additional timeslots.

10. A communication system, comprising:
    a base station subsystem;
    a mobile station receiving and transmitting circuit-switched voice data and packet-switched data along a traffic channel to the base station subsystem, wherein the mobile station transmits packet-switched data to the base station subsystem and receives packet-switched data from the base station subsystem during frame periods occurring at associated timeslots between voice and signaling frames and silence descriptor frames of discontinuous transmission and discontinuous reception operations between the mobile station and the base station subsystem;

a physical layer; and a medium access controller layer organizing transmission and reception of packet-based information onto and from the physical layer, including logic by which the mobile station is informed of a right to transmit.

11. The communication system of claim 10, further comprising an assignment control logic component layer informing the mobile station of assignment of the associated timeslots.

12. The communication system of claim 10, wherein packet-switched data is transmitted and received on the same circuit-switched voice timeslot during discontinuous transmission and discontinuous reception operations as circuit-switched data, and transmission by the mobile station is governed by an uplink timeslot assignment and availability of time in which to send data in discontinuous transmission operation.

13. The communication system of claim 10, wherein the associated timeslots include a voice timeslot and data timeslots, and wherein the data timeslots are firmly associated with each other and with the voice timeslot.

14. The communication device of claim 10, wherein circuit-switched voice data and packet-switched data are streamed in the discontinuous transmission and discontinuous reception operations between the voice and signaling frames and silence descriptor frames are located in a first timeslot, and packet-switched data is located in one or more firmly associated additional timeslots.

* * * * *